United States Patent

[11] 3,610,457

| | | |
|---|---|---|
| [72] | Inventor | Vincent J. Opalewski<br>Rockaway, N.J. |
| [21] | Appl. No. | 844,354 |
| [22] | Filed | July 24, 1969 |
| [45] | Patented | Oct. 5, 1971 |
| [73] | Assignee | Allied Chemical Corporation<br>New York, N.Y. |

[54] ROTATIONALLY MOLDED HOLLOW ARTICLE WITH INSERT
11 Claims, 7 Drawing Figs.

[52] U.S. Cl. .................................................. 220/22
[51] Int. Cl. ................................................... B65d 25/04
[50] Field of Search ..................................... 220/20, 22;
206/2

[56] References Cited
UNITED STATES PATENTS
1,545,328  7/1925  Holland ........................ 206/2

FOREIGN PATENTS
1,475,901  2/1967  France ........................ 220/22

Primary Examiner—George E. Lowrance
Attorney—Jonathan Plaut

ABSTRACT: An insert is affixed to the inner wall of a rotationally molded hollow article by securing a wad of absorbent fibers to the insert and frangibly mounting the insert within the cavity of the mold. Upon rotationally molding a charge of the plastic, a column thereof is formed about the wad between the wall and the insert, and the insert is coated with plastic. After curing, the frangible mount is removed and the cavity in the plastic wall resulting from the removal may be sealed to provide the final product. The method is useful for affixing baffles within rotationally molded liquid storage tanks.

INVENTOR
VINCENT J. OPALEWSKI
BY
David J. Brady
AGENT

PATENTED OCT 5 1971

INVENTOR
VINCENT J. OPALEWSKI
BY
David J. Brody
AGENT

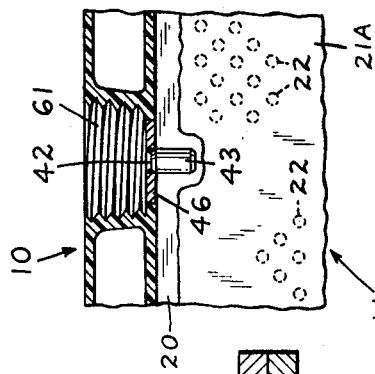
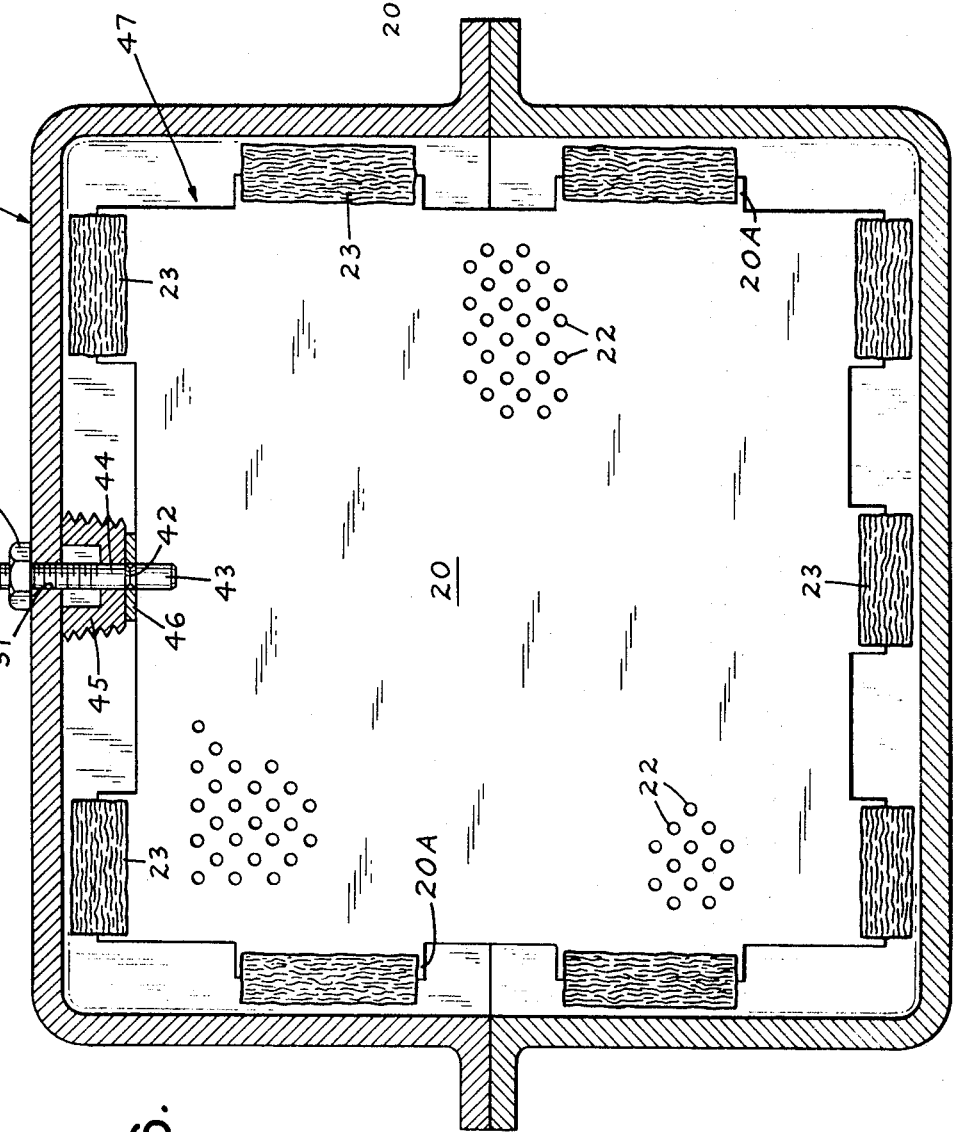

ROTATIONALLY MOLDED HOLLOW ARTICLE WITH INSERT

BACKGROUND OF THE INVENTION

This invention relates to rotationally molded hollow plastic articles, and in particular to a method of affixing an insert to the interior surface of the wall thereof.

The use of rotational molding as a processing method in the plastics industry has increased substantially in the past few years, especially the use of the "puddle" technique by which hollow plastic articles of virtually any size and configuration can be produced. According to the "puddle" technique, the plastic is charged into the mold where it forms a puddle of liquid which is maintained at the low point of the mold. The mold is then caused to rotate simultaneously about two intersecting axes whereby during each complete rotational cycle, successive portions of the interior walls of the mold pass in turn under the puddle of liquid. In this manner, the charge is uniformly distributed over the interior surface of the mold to form the desired article. The various techniques which have developed in the rotational molding process are reviewed in 1968 *modern Plastics Encyclopedia*, vol. 45 (Sept. 1967, No. 1A) pp. 830-833. U.S. Pat. Nos. 2,624,072 and 2,659,107 further illustrate the scope of the "puddle" technique wherein is described the rotational molding of plastisol dispersions of resins. Also, monomer can be charged into the mold with polymerization occuring simultaneously with the molding operation, a technique particularly useful in the case of anionically polymerized lactams as disclosed in U.S. Pat. Nos. 3,015,652; 3,017,391; 3,017,392; and 3,018,273; British Pat. 924,553; and French Pat. 1,349,953. Additionally, U.S. Pat. No. 3,417,097 discloses a sequential process for rotationally molding anionically polymerized nylon.

The rotational molding process, being well suited to the production of large hollow articles, is often used to make plastic containers. Since the product is seamless and substantially fully enclosed, special provision is required to provide inserts within the article, e.g., baffles within liquid storage tanks; it is necessary to mold the insert in place by mounting it in the cavity of the mold prior to forming the article. However, the necessity of mounting the insert in the mold results in a discontinuity in the wall of the plastic article since the plastic is molded around the mount. Thus, when the insert is mounted on a bolt, which extends into the cavity of the mold, this bolt will protrude through the wall of the finished article and the discontinuity in the wall at the interface between the plastic and bolt provides a passage through which various liquids and gases might possibly slowly leak. Therefore, in order to insure that the wall is impermeable and suitable for use, e.g., as a liquid storage container, it is customary to seal the passage. This requires an additional step in the method of manufacturing the plastic article which is subject to high rejection rate of finished article if not done carefully. The problem is greatly magnified in situations requiring a very securely affixed insert. For example, a baffle within an automotive gasoline tank must be able to withstand the substantial force generated by surging of the gasoline in combination with shock resulting from movement of the vehicle over rough ground. Therefore, these baffles should be affixed to the tank at several points and, depending upon the size of the tank, as many as a dozen mounts may be required. Each of these mounts, heretofore, has required individual attention which greatly increased the cost of manufacture and risk of unreliability. For this reason, it is desirable to provide a method of securely affixing an insert within a rotationally molded hollow plastic article which provides for a minimum number of discontinuities in the wall which require sealing.

SUMMARY OF THE INVENTION

It has now been found that an insert can be securely affixed to the interior surface of the wall of a rotationally molded hollow plastic article by the steps of:

securing to said insert a wad of material capable of absorbing said plastic during the rotational molding operation and consisting of fibers which, under molding conditions, are inert to and become limp upon absorbing said plastic;

mounting said wad-bearing insert within the cavity of a mold for said article on mounting means frangible at a point within said cavity, and mounted insert being spaced from the interior wall of said mold in a manner to situate the point on said insert at which said wad is secured within bridging distance of said interior wall;

rotationally molding a charge of said plastic in said mold to form said hollow article, thereby concurrently therewith coating said inset with said plastic and forming a column of said plastic integrally with the wall of said hollow article, said column extending inwardly from said article wall about said secured wad and having said insert affixed upon the end thereof;

separating and removing said mounting means from the insert at said frangible point after forming said article; and removing said hollow article from said mold. By means of this method, an insert can be affixed to the article wall at as many points as desired while the number of mounts requiring sealing is kept to a minimum. The product thus obtained has a more securely affixed insert than those available heretofore and is more reliable and more efficiently manufactured.

BRIEF DESCRIPTION OF THE DRAWINGS

For a better understanding of the instant invention, reference is made to the accompanying drawings, wherein:

FIGS. 5-7 illustrate steps in the manufacture of the embodiment of FIG. 1.

DETAILED DESCRIPTION OF THE INVENTION

In accordance with the instant invention, a method is provided for rotationally molding a hollow plastic article which has an insert affixed to the interior surface of the wall thereof in such a manner that there are a minimum number of supports for said insert which extend through the plastic wall. The method provides a plastic column formed integrally with the wall of the article and which extends inwardly therefrom into the cavity of the hollow article and upon which the insert is affixed. During rotational molding of the article in the manner of the instant invention, the insert is frangibly mounted within the cavity of the mold on the minimum number of supports needed to keep it in place during the molding operation. A wad of material previously secured to the insert will absorb the plastic during the molding operation, thereby forming a column of the plastic between the wall and the insert upon which the insert is affixed. The wad of material impregnates this column, but since the wad consists of fibers which become limp upon absorbing the plastic, it does not form discontinuities through the wall which would render it permeable. This is true even if fibers extend through to the exterior surface of the wall.

Figure 1:
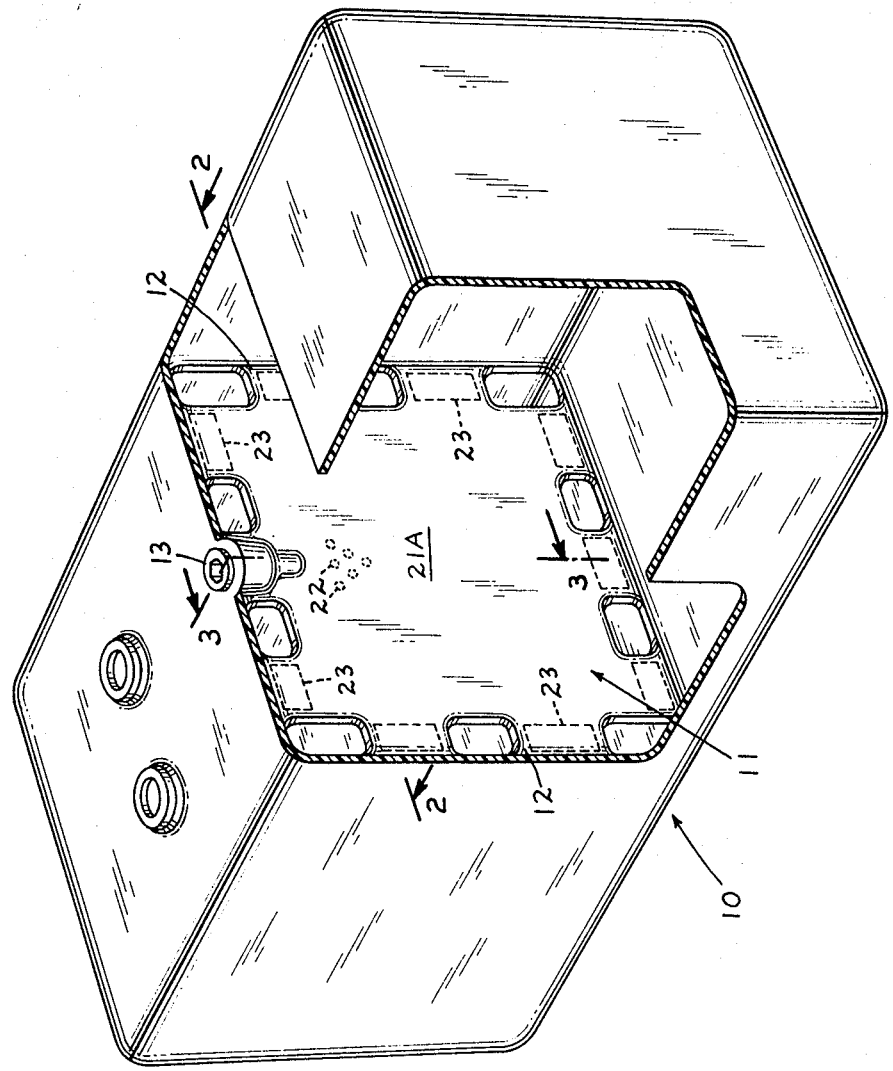
FIG. 1 is a perspective, partially cut away, view of a hollow plastic article having an insert affixed to the interior surface of the wall thereof in the manner of the instant invention.
Figure 3:
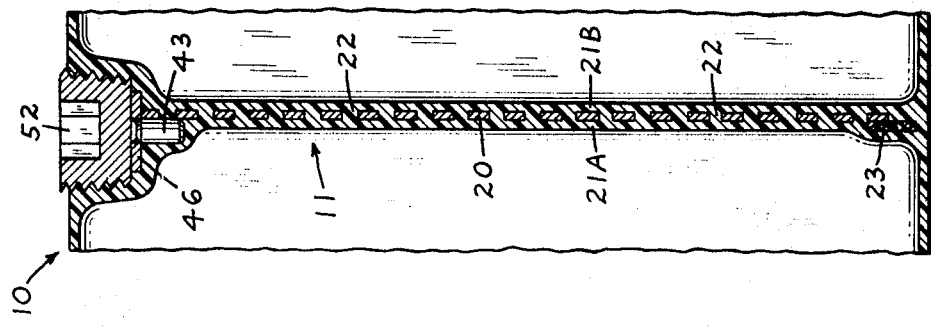
FIG. 3 is a partial vertical sectional view of the embodiment of FIG. 2 along the line 3—3.
Figure 2:
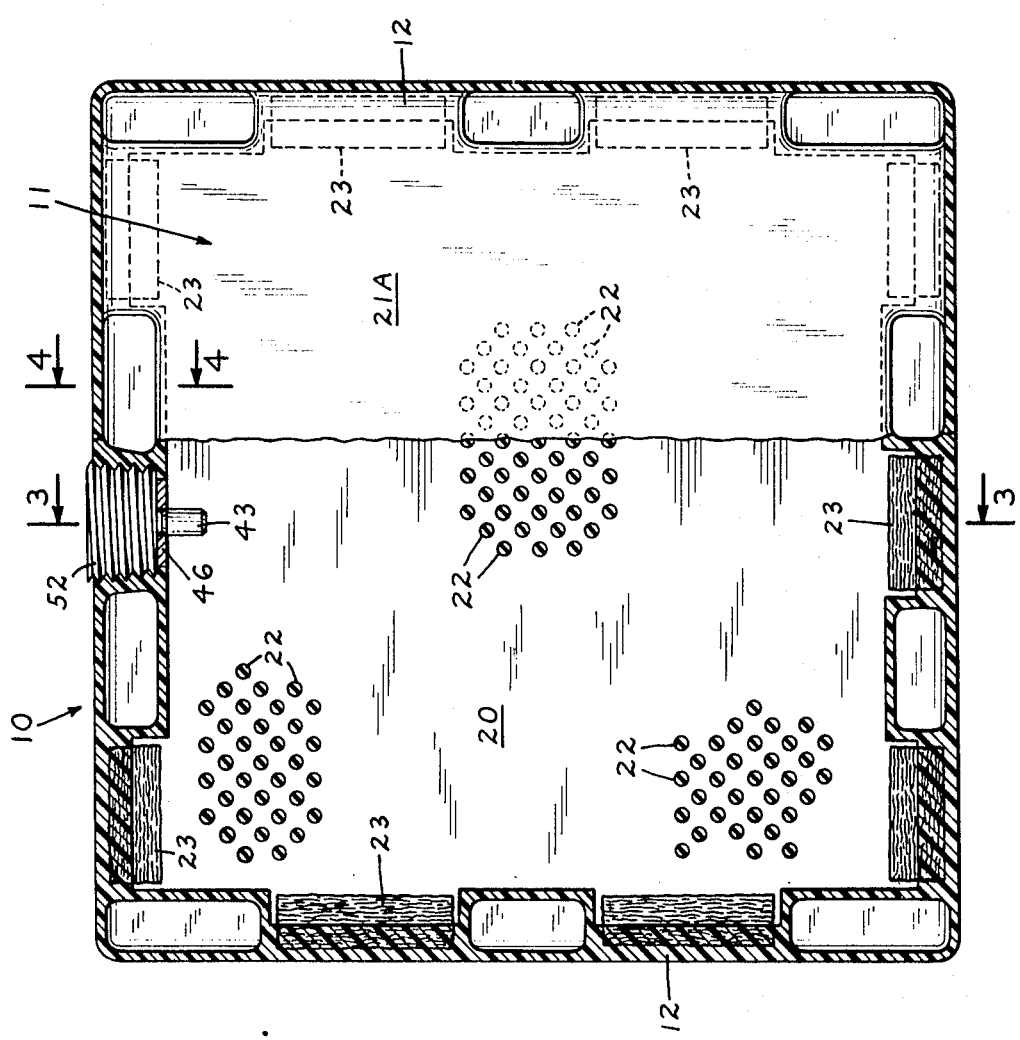
FIG. 2 is a transverse sectional view of the embodiment of FIG. 1 along the line 2—2, with portions of the front layer of plastic on the insert not shown.
Figure 4:
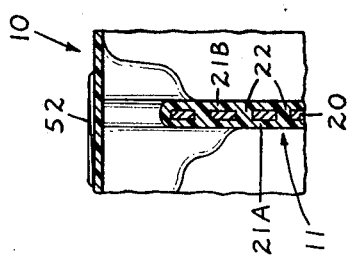
FIG. 4 is a partial vertical sectional view of the embodiment of FIG. 2 along the line 4—4.
Figure 5:
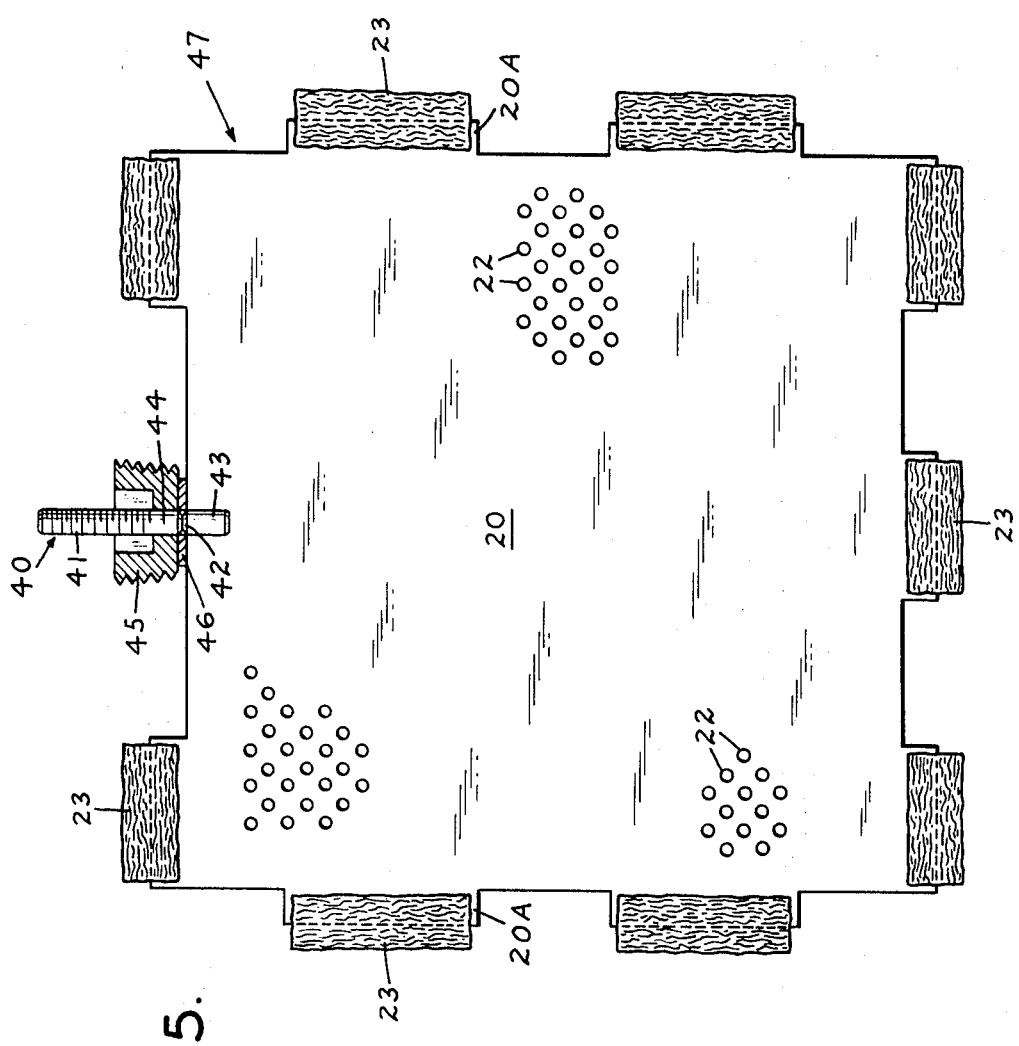

With reference to the drawings, a plastic tank 10, illustrated in FIG. 1, is provided with a baffle 11 rigidly mounted therewithin upon plastic columns 12, which are formed integrally with tank 10. As shown in FIGS. 2, 3 and 4, baffle 11 consists of sheet metal 20 with plastic coatings 21A and 21B on each side thereof and connected to each other through perforations 22, and columns 12 are impregnated with fibrous wads 23 which are secured to tabs 20A of sheet metal 20. In the manufacture of tank 10, perforated sheet metal 20 is mounted on the end of bolt 40, shown in FIG. 5, the other end of which is threaded at 41. Bolt 40 is partially cut through at 42, rendering it frangible into lower segment 43 and upper segment 44, at least a portion of which is threaded in the manner indicated above. Upper segment 44 passes through a drilled-out socket head pipe plug 45, the outer periphery of which is threaded, and which is spaced from sheet metal 20 by washer 46. Also, wads of absorbent fibrous material 23 are secured to tabs 20A of sheet metal 20 at points at which it is desired to support the baffle in the finished product. Wads 23 are secured at one end thereof, permitting them to hang freely from sheet metal 20. This entire insert assembly 47 is mounted within mold 50 in the manner illustrated in FIG. 6, with bolt 40 serving as the mounting means. Thus, upper segment 44 thereof is passed through hole 51 where it is drawn up tight by nut 52. Sheet metal 20 is spaced from mold 50 by plug 45 and washer 46 a distance greater than the thickness of the wall of tank 10, and in such a manner that wads 23 do not quite touch the wall of mold 50 when they are fully extended in the manner illustrated.

After insert assembly 47 is securely mounted within the mold 50 in this manner, plastic is charged and rotationally molded. Thus, tank 10 is formed, a fragmentary portion of which is shown in FIG. 7 having plastic wall 60 of uniform thickness conforming to the shape of mold 50. During the rotational molding operation and as a result of being repeatedly dipped into the plastic puddle being distributed, wads 23 absorb the plastic and thereby support plastic columns 12. After curing, columns 12, which formed about and are therefore permeated by wads 23, are provided which are formed integrally with tank wall 60 and upon which sheet metal 20 is affixed. Since sheet metal 20 was originally spaced from mold 50 a distance greater than the thickness of plastic wall 60, it is also spaced from wall 60 of the finished product.

Additionally, during the rotational molding procedure, plastic from the puddle flows along bolt 40 and over sheet metal 20, thereby providing baffle 11 as a substantially fully coated insert, as illustrated in FIGS. 1-4.

Following curing of the distributed plastic, nut 52 is removed and tank 10 is stripped from mold 50. Upper segment 44 of bolt 40 is then removed by breaking it at frangible point 42, and plug 45 is unscrewed, leaving tank 10 as shown in FIG. 7, with cavity 61 in wall 60 from where plug 45 was removed. The finished article illustrated in FIG. 1 is then obtained by inserting undrilled-out socket head pipe plug 13 into cavity 61, using pipe dope if desired, to insure a good seal.

The instant method of affixing an insert within a rotationally molded hollow article can be effectively employed with any of the plastics which may be processed by the rotational molding "puddle" technique, for example, polyvinyl halides, latex and polyamides. Among the polyamides with which the instant invention can be utilized are polylactams such as polymers of e-caprolactam, dodecanolactam, pentadecanolactam, hexadecanolactam, methylcyclohexanone isoximes, cyclic hexamethylene adipamide, etc., and mixtures thereof. Poly (e-caprolactan) is preferred. These polylactams can be advantageously prepared during the molding process by anionic polymerization techniques taught by the references mentioned hereinbefore.

When molding any of these plastics by the instant method, the wad of fibrous material secured to the insert for the purpose of absorbing and supporting the plastic columns must, of course, be capable of absorbing the plastic during the rotational molding procedure. Therefore, it is preferred that the fibrous material have a relatively low bulk density. It is also necessary that the fibers be inert to the plastic under rotational molding conditions and that they become limp upon absorbing the plastic. This latter requirement is essential if the article wall is to be impermeable, since a limp fiber will not render the wall permeable even if it extends to the outer surface of the wall. A fiber which does not become limp, on the other hand, will result in an unacceptable product in such a situation. In a preferred embodiment of this invention, the wad does not extend to the outer surface of the article, but this preference is for the sake of obtaining a smooth outer surface and not for obtaining an impermeable wall. For the above reasons, selection of a specific material for the fibrous wad will depend upon the plastic being molded. When the plastic to be molded is anionically polymerized e-caprolactam, a wad of cotton fiber may be employed in the instant process, preferably anhydrous cotton since water is a poison for the polymerization reaction. Another preferred material for this purpose is very fine denier glass fiber which becomes limp upon absorbing the fused e-caprolactam. Typical of the fine denier glass fiber which might be employed with poly(e-caprolactam) is borosilicate glass fiber having fiber thickness less than about 0.00020 inch, preferably less than about 0.00015 inch. When other type glass is used, the acceptable fiber thickness will vary somewhat since the glass composition will affect the capability of the fibers to become limp. It has been found that glass fiber of conventional fiber thickness is inoperative in the instant invention since it does not become limp upon absorbing the plastic. Also inoperative with poly(e-caprolactam) is wool, which dissolves in the polymer system. With other polymer systems, the selection of fibrous material may vary with requirement that the fiber be inert and become limp in the above manner; for example acrylonitrilevinyl chloride copolymer fibers may be utilized when molding vinyl plastisols. Inasmuch as the operability of a particular wad of fibrous material is dependent upon the plastic to be molded, the wad to be used should be evaluated prior to use. This is easily accomplished by dipping the wad into a puddle of the plastic under molding conditions; if it absorbs the plastic and the fibers thereof, are inert and become limp, the material can be used satisfactorily with that plastic.

The wad of absorbent material is secured to the insert, preferably to an edge thereof, by means of adhesive, clip, stitching, staples or any other effective fastening means, most conveniently prior to mounting the insert within the mold.

The insert is then mounted within the cavity of the mold on frangible mounting means, preferably using the minimum number of frangible mounting means required to hold the insert securely in place during the molding operation. With many inserts, a single frangible mount is sufficient. By "frangible mounting means " is meant throughout one which holds the insert in place during the molding operation but which can be readily disengaged and removed after formation of the plastic columns about the secured wads. The mounting means can be rendered frangible for purposes of this invention by any of a variety of ways familiar to those with ordinary skill in the art, for example, by providing as mounting means a bolt which is partially cut through and which can therefore be easily broken into two segments. It is also possible to frangibly mount the insert by providing it with a threaded received into which the end of the mounting bolt can be screwed; after formation of the plastic columns, the bolt can be unscrewed from the insert and withdrawn. Other obvious means can be used in an equivalent fashion, but the preferred method is to utilize a partially cut-through bolt in the above manner, which is attached to the insert by welding, soldering, etc. When the insert is mounted within the cavity of the mold, it is preferred that the frangible point on the mounting means be situated within the mold cavity, since any portion of the mount which remains attached to the insert in the finished product will thereby not extend beyond the exterior surface of the plastic wall of the finished product.

When the insert is mounted within the mold cavity it must, of course, be spaced from the mold wall so that the insert itself does not extend through the plastic wall of the finished article. In this regard, it is necessary to accommodate any shrinking which might occur in the article as in the case of poly(e-caprolactam) where the finished article shrinks away from the mold wall. According to a preferred embodiment of the instant invention, the insert is spaced from the mold wall a distance greater than the wall thickness of the article to be molded so that it will also be spaced from the wall of the finished product. In this way, distortion of the finished product due to shrinkage of the plastic walls against the edge of the insert is minimized. However, the insert cannot be spaced from the mold wall a distance too great to permit formation of the desired plastic columns. Thus, the point on the insert at which the absorbent wads are secured must be situated within "bridging distance" of the mold wall, by which is meant throughout a distance across which the desired plastic columns are capable of forming. Depending upon the size and configuration of the absorbent wads, and the size of the article to be molded, what will constitute a bridging distance will vary. Thus, a substantial wad which almost fully spans the separation between insert and mold wall will permit greater distances between the insert and wall since the wad will support a longer plastic column during the molding operation. Also, a relatively substantial wad will result in formation of a stronger column, thereby affixing the insert more securely in the final product. For these reasons, it is preferred to use a relatively substantial wad, for example, one having a depth of at least about 0.1 inch. Nevertheless, even when using substantial wads, it is preferable that the point of the insert at which the wad is secured be spaced within about 2.5 inches from the mold wall since bridging efficiency decreases at greater distances. Typical distances of about 0.5–1.0 inch have afforded excellent results.

After mounting the insert within the mold in the above manner, using the minimum number of frangible mounting means necessary to keep it securely in place during the rotational molding operation, the mold is closed and charged with the plastic material to be fabricated. The ensuing molding operation will then concurrently form the plastic article, the plastic columns upon which the insert is affixed, and the plastic coating over the insert assembly. After stripping the article from the mold, the mounting means is broken at the frangible point, for example by twisting the partially cut-through bolt described hereinbefore, and the separated portion thereof is withdrawn and removed to leave a cavity in the wall of the article. This cavity is then preferably sealed in any manner which meets the requirements of the intended use of the finished article. For example, when a gasoline tank is being fabricated, it is preferred that the seal be able to prevent even minor seepage which would result in objectionable fumes. Any of a variety of techniques familiar to those skilled in the art will be adequate for this purpose, for example by induction welding or solvent welding a plug of plastic in the cavity. A preferred method of sealing is that illustrated in the drawings, wherein a drilled-out plug is used to space the insert assembly from the mold wall After the molding operation, this drilled-out plug is removed along with the frangible mounting means to leave a relatively large cavity, into which is then threaded a solid plug. Also, when a sequential molding operation is used, such as that disclosed in aforesaid U.S. Pat. No. 3,417,097, the second distribution can be arranged to provide the seal automatically by removing the frangible mounting means between the two distributions and permitting the second distribution to fill the resulting cavity in the first distribution.

As indicated hereinbefore, during the rotational molding process according to the instant invention the insert assembly becomes substantially fully coated with the plastic. In order to avoid problems from the plastic coating pulling free of the insert, especially when the insert has a large flat surface as with a baffle, it is preferred that the insert be made of a material to which the plastic will adhere. Sheet metal, such as plain carbon steel, is convenient for this purpose in the case of articles being made from poly(e-caprolactam). For this same reason, it is also preferred that the sheet metal be perforated with holes through which the plastic can flow during the molding operation, whereby the plastic coatings on opposite sides of the sheet are securely joined to each other. The number and size of the perforations is not critical so long as they provide adequate joinder between the two coatings.

It is because of the plastic coating about the insert that it is not essential to seal the cavity in the article wall which results from removal of the frangible mounting means. Where the insert is fully coated, there is no path by which the contents of the article might seep through to the cavity; only because the insert may not become fully coated during the molding operation is it preferable to seal the cavity.

The following example is provided to illustrate the instant invention more fully. It is provided for illustrative purposes only and is not to be construed as limiting the invention which is defined by the appended claims. It will be obvious to those skilled in the art that certain deviations and alterations from the example can be made without departing from the scope of the invention.

EXAMPLE

A sheet of 18-gauge plain carbon steel, having 0.12 inch perforations on 0.25 inch staggered centers, was cut to the shape of sheet metal 20 in FIG. 4, with dimensions of 10×10 inches and 2×0.5 inches tabs about the periphery. To each tab was stapled a wad of borosilicate glass fiber, fiber thickness 0.00010–0.00015 inch (Beta glass of Owens Corning Fiberglas). The wads were 2 inches long to cover the full length of the tabs, about 0.1 inch deep, and the freely hanging end extended about 0.4 inch beyond the sheet metal. A partially cut-through bolt was welded to the center of the top edge of the sheet metal, with its free end passing successively through a washer, a drilled-out 1-inch socket head pipe plug, and a hole in a mold for a 12×12×30-inch gasoline tank. A nut was threaded over the end of the bolt passing out of the mold to draw the assembly up tight with the plane of sheet metal being perpendicular to the long dimension of the mold. A half-inch gap separated each tab from the mold wall. The mold was sealed and subjected to the rotational molding process of example 1 of U.S. Pat. No. 3,275,733 with a 9-pound charge, after which the nut was removed from the mounting bolt and the tank was stripped from the mold. The bolt was then twisted with pliers until it broke at the preweakened section and the drilled-out pipe plug was unscrewed and replaced with a solid one. The resulting tank had a baffle securely affixed therewithin and was suitable for storage of gasoline.

Equivalent results are obtained when the glass fiber wads are replaced with anhydrous cotton.

What is claimed is:

1. A rotationally molded hollow article comprising a plastic wall enclosing an interior cavity and having a second cavity in the exterior surface thereof; an insert within said interior cavity coated with said plastic; and a column of said plastic formed integrally with said wall extending inwardly therefrom, said column including a plurality of fibrous wads inert to said plastic, coated with said plastic, and secured to said insert at the point of affixation thereof upon said column.

2. The hollow article of claim 1 wherein said affixed insert is spaced from said plastic wall.

3. The hollow article of claim 1 wherein said plurality of fibrous wads does not extend to the exterior surface of said plastic wall.

4. The hollow article of claim 1 wherein said insert has perforations filled with said plastic coating.

5. The hollow article of claim 1 additionally comprising a seal in said second cavity in the exterior surface of said plastic wall.

6. The hollow article of claim 5 wherein said seal is a metal plug.

7. The hollow article of claim 5 wherein said seal is a welded plug of said plastic.

8. The hollow article of claim 1 wherein said plastic is a polyamide.

9. The hollow article of claim 8 wherein said plastic is anionically polymerized e-caprolactam.

10. The hollow article of claim 9 wherein said plurality of fibrous wads consists of anhydrous cotton fibers.

11. The hollow article of claim 9 wherein said plurality of fibrous wads consists of borosilicate glass fibers having fiber thickness less than about 0.00020 inch.